April 29, 1930. R. J. SMITH 1,756,072
STORAGE BATTERY CELL AND THE OPERATION THEREOF
Filed Jan. 30, 1922
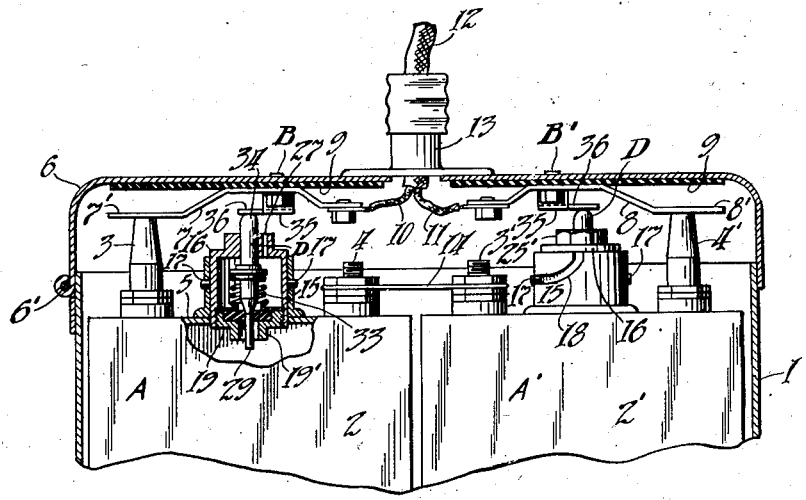
INVENTOR
Roscoe J. Smith
BY
Henry Lanahan
ATTORNEY Patented Apr. 29, 1930

1,756,072

UNITED STATES PATENT OFFICE

ROSCOE J. SMITH, OF EAST ORANGE, NEW JERSEY, ASSIGNOR TO EDISON STORAGE BATTERY COMPANY, OF WEST ORANGE, NEW JERSEY, A CORPORATION OF NEW JERSEY

STORAGE-BATTERY CELL AND THE OPERATION THEREOF

Application filed January 30, 1922. Serial No. 532,596

My invention relates to storage battery cells and the operation thereof and more particularly to an improved arrangement especially designed for use in venting or controlling the venting of storage battery cells of the Edison type of small size having only a small capacity and discharge rate, such as those employed for portable electric safety lamps, and also to an improved method of operating such cells. It is to be understood, however, that my invention is capable of use in connection with battery cells of other types and sizes.

In general, my invention resides in an improved method of operating storage battery cells and an improved venting arrangement for the latter whereby the containers of the cells are maintained sealed during one condition of operation of the cells and preferably during the discharging operation thereof, and whereby the venting of the cell containers is effected upon a change in the operating condition of the cells or during another condition of operation thereof, and preferably upon the discontinuance of the discharging operation or during the charging operation.

It has heretofore been customary to equip the containers for the battery elements and electrolyte of storage battery cells with vent means adapted to permit the escape of gas from the cell containers both when the cells are being charged and when they are discharged. The amount of gas evolved during the charging of such a cell is, however, far in excess of that evolved during discharge. I have found, especially in the case of small cells having a low capacity and discharge rate, that the amount of gas evolved during discharge is so small that the cell containers may safely be maintained sealed and air-tight during the entire period of discharge, without any danger whatever of disrupting the containers or injuriously effecting the same. In operating such a cell I therefore preferably maintain the cell container tightly sealed against the escape and entrance of gases and other fluids while discharging the cell and vent the container only during the periods when the cell is not being discharged and preferably during such times as the cell is being charged. After charging the cell, I then preferably seal the cell container and keep the cell idle or on open circuit in this sealed condition for a considerable length of time before using or discharging the same, as I find that by so doing the capacity of the cell, for reasons which as yet I have been unable to fully determine, is very appreciably increased. In general the longer a charged cell is maintained idle or on open circuit with the cell container sealed, before being discharged, the greater will be the increase in the capacity. In my experiments, cells which after being charged, have been kept idle or on open circuit with their containers sealed for a period of six hours, have, upon then being discharged, shown an increase of as much as 25% in their capacity.

My invention further resides in the provision of a simple and improved form of vent means for a cell which is adapted to effectively separate or filter the liquids from the gases escaping from the cell container and to effect the return of such separated liquids to the latter, thereby insuring a dry exterior to the container and preventing the establishment of short circuits which might result from the depositing of potash or other materials present in the electrolyte, upon said exterior.

Where my improved venting arrangement is used in connection with a cell all danger of explosions due to gas escaping from or entering the cell container during the discharging operation, is entirely obviated. Moreover, with the improved vent means forming a part of such arrangement, there is no possibility of any of the electrolyte escaping from the cell container, however the latter is tipped, during discharging of the cell, this means comprising what is, in effect, an absolutely non-spillable vent.

Other features and objects of my invention will be hereinafter more fully described and claimed.

In order that my invention may be more clearly understood, attention is directed to the drawing accompanying and forming a part of this specification, and in which, Figure 1 is a fragmental view in side elevation, partly in section, of a pair of storage battery cells and a casing within which the latter are disposed, provided with a preferred form of my improved venting arrangement; and Fig. 2 is an enlarged detailed view, partly in elevation and partly in section, of a portion of one of the cells shown in Fig. 1 and the vent means applied thereto.

Referring to the drawing, reference character 1 represents a casing, and A, A' a pair of small storage battery cells of the Edison type disposed in said casing. The cell containers 2, 2' are preferably rectangular in shape and preferably formed of thin sheet steel which has been carefully nickel-plated so as to prevent oxidation. The usual alternately arranged positive and negative electrode plates (not shown) are disposed in a suitable electrolyte within the containers 2, 2'. The cells A, A' are respectively provided with the usual positive poles 3, 3' and negative poles 4, 4', the poles of each cell extending above the top 5 of the respective cell container through suitable fluid-tight stuffing boxes which serve to insulate the poles from the container. A suitable cover 6 is hinged as at 6', to the casing 1 at one side of the latter, and when in closed position as shown in Fig. 1, telescopes the outside of the casing. The cover 6 is adapted to be fastened in closed position by suitable locking means (not shown). Reference characters 7 and 8 represent a pair of contact members or arms which are formed of thin resilient metal and are rigidly secured to the cover intermediate their ends by means of screws or bolts B, B', these arms being insulated from the cover in any suitable manner as by means of insulation 9 secured to the under side of the cover. The end portions of arms 7 and 8 are deflected downwardly with reference to their points of connection with the cover 6, the adjacent end portions thereof being respectively connected in any suitable manner to conductors 10 and 11, while the opposite end portions 7' and 8' thereof are so arranged that when the cover 6 is closed they will respectively resiliently engage or contact the pole 3 of cell A and the pole 4' of cell A'. These poles 3 and 4' are of opposite polarity. The conductors 10 and 11, sheathed in a flexible insulating cable 12, extend through an opening in the cover 6 and a short tubular member 13 suitably secured about said opening to the upper side of the cover 6, for connection with a miner's lamp or other current consuming means, said conductors and current consuming means comprising an external discharging circuit. A bar or connector 14 of conductive material is secured at one end to the pole 4 of cell A and at its other end to the pole 3' of cell A' (said poles being of opposite polarity), whereby the cells are connected in series.

I shall now proceed to describe a preferred form of my improved vent means as applied to the cells A, A':

The top 5 of the container of each of the cells A, A' is provided with a large central opening surrounded by a short tubular member 15, the latter being flanged at its lower end and secured to the top of the container about said opening, as by spot-welding. Reference character 16 represents a hollow cylindrical member or casing which fits closely within the tubular member 15 and which is rigidly but removably secured therein by a bayonet lock comprising a pair of pins 17 carried by the casing 16 at diametrically opposite points and a pair of bayonet slots 18 formed in the member 15 and with which the pins 17 respectively engage. The casing 16 is provided at its lower end with a removable closure member or bottom 19, the bore of the casing being enlarged at the lower end portion thereof and the bottom 19 having screw-threaded connection with such enlarged portion of the bore. The bottom 19 is provided centrally thereof with an opening 20, which serves to establish communication between the interior of the cell container and the casing 16. The upper side of the bottom 19 is provided centrally thereof with a cylindrical recess in which is disposed a soft rubber disc or gasket 21 having a central opening 22 communicating with but somewhat less in diameter than the opening 20 in member 19. The disc 21 is held in position in the recess provided therefor in member 19, by means of a thin metallic ring or apertured disc 23 overlying the same and held at its peripheral edge portion by the member 19 against the shoulder formed between the main portion of the bore of casing 16 and the lower enlarged end portion of said bore. The disc 23 is provided with an inner annular upstanding rim or flange 24 the purpose of which will presently be described. The bottom 19 is provided with a central downwardly projecting boss 19', this boss preferably being hexagonal to enable the bottom to be readily removed from the casing 16 by a suitable wrench. The casing 16 is closed at its upper end, the top 25 thereof being provided with a central upwardly extending boss 25', which is also preferably hexagonal in shape to enable the casing 16 and the parts carried thereby to be readily removed from the tubular member 15 by means of a suitable wrench or tool, as for example when it is desired to replenish the electrolyte of the cell through the opening in the top of the cell container. The top 25 of casing 16 is also provided with a central cylindrical opening 26 therethrough in alignment with the opening 22 in the bottom 19, and with a vent opening 27 therethrough establishing communication between the interior of the casing 16 and the outside atmosphere. A valve member D is disposed within the casing 16, and is preferably mounted therein for vertical reciprocatory movement. The member D comprises an upper cylindrical portion 28, a lower reduced cylindrical portion 29, and an intermediate conical portion 30 adapted to cooperate with the resilient ring or gasket 21 in a manner presently to be described. The upper portion 28 of the valve member or plunger D is disposed and fits closely within the opening 26 in the top 25 of the casing 16 and projects above the casing, while the reduced lower portion 29, which is somewhat less in diameter than the opening 22 in the gasket 21, extends through said opening 22 and the opening 20 in the bottom 19, and is of such a length that in all positions of the member D it will project below the bottom 19. The valve member D is provided some distance above the conical portion 30 thereof, with a collar 31 having intermediate its ends an annular flange 32. The upper end of the collar 31 cooperates with the top 25 of casing 16 to limit the upward movement of the valve member or plunger D, the latter being biased to and normally held in its uppermost position, as shown in Fig. 2, by means of a helical spring 33 which surrounds said member and the ends of which respectively engage and coact with the disc 23 and the annular flange 32. The rim or flange 24 of disc 23 and the lower portion of the collar 31 on the valve member D respectively engage within the lower and upper end portions of the spring 33 and coact therewith to center and maintain the same properly positioned with respect to the valve member. When the valve member is in its raised position, as shown in Fig. 2, any gas within the cell container will escape from the latter by passing through the openings 20 and 22, then through the casing 16 and out through the vent opening 27 in the top of the casing to the outside atmosphere, that is, when the valve member is in this position the cell container will be vented. The annular flange 32 is of such a diameter as to extend into or intercept the normal path of gases passing through the opening 27, and effectually acts to separate or strain from gases escaping from the cell practically all globules or particles of the electrolyte carried thereby or entrained therewith. The electrolyte thus separated from the escaping gases flows or drops to the bottom of casing 16 and returns to the cell container through the openings 22 and 20. Accordingly, the gases which escape to the outside atmosphere through the opening 27 will carry substantially no electrolyte and the exterior of the container will therefore be maintained dry and free from deposits of potash or other material in solution in the electrolyte.

The bolts or screws B, B' by which the contact arms or members 7 and 8 are fastened to the cover 6 of the casing 1, also serve to secure a pair of brackets 35 to said cover. These brackets 35 are provided with arms or extensions 36 which are so positioned as to respectively coact with the upper rounded ends 34 of the valve members D of the cells A, A'. When the cover 6 is moved to closed position the resilient end portions 7' and 8' of contact arms 7 and 8 will be respectively moved into engagement with the poles 3 and 4' of cells A, A' to thereby connect the latter in the external or discharging circuit, and the arms 36 of brackets 35 will simultaneously be brought into engagement with the upper ends 34 of the valve members D and depress the latter against the action of springs 33, so as to force the conical portions 30 thereof into the openings 22 of the rubber rings or gaskets 21 and thereby tightly close or seal the cell containers 2, 2' against the escape of gas, as shown in Fig. 1. When the cover 6 is opened the contact arms 7 and 8 will be moved out of engagement with the poles 3 and 4' of the cells A and A' to thereby disconnect the cells from the external or discharging circuit, and at the same time the arms or extensions 36 of brackets 35 will be disengaged from the upper ends of the valve members D and the springs 33 will thereupon act to automatically move the valve members D to their uppermost position with the conical portion 30 out of engagement with the rubber rings or gaskets 21 to thereby effect the venting of the cell containers.

The cells A, A', the casing 1 and the parts associated therewith, shown in Fig. 1, comprise part of a miner's electric safety lantern outfit, the conductors 10 and 11 being connected, as stated above, to an electric lamp (not shown), provided with a switch of a conventional type. When the outfit is in use the cover 6 is preferably maintained locked in closed position, as shown in Fig. 1, and accordingly during the discharging operation of the cells the cell containers will be maintained tightly sealed, as explained above, against the escape and entrance of gas and other fluids. When the cells A, A' are nearly run down, the cover 6 is opened, thereby effecting the disconnection of the cells from the external or discharging circuit and the venting of the cell containers. The poles 3 and 4' are now connected in a suitable charging circuit and the cells charged to full capacity. During this charging operation the valve members D are maintained in open position by springs 33 and permit the gases evolved to escape from the cell containers 2, 2'. Upon the completion of the charging operation the cover 6 is closed thereby effecting the sealing of the cell containers and the connection of the cells with the conductors 10 and 11, and the cells are then preferably kept idle or on open circuit in this sealed condition for a sufficient length of time to effect an appreciable increase in the capacity thereof, as explained above, before the outfit is put into use. The cells may be placed on open circuit with the cover 6 closed, merely by moving the switch of the lamp to "off" position.

It is to be understood that the construction and arrangement and also the method specifically described herein are subject to various changes and modifications without departure from the spirit of the invention or the scope of the appended claims.

Having now described my invention, what I claim as new and desire to protect by Letters Patent is as follows:

1. In combination, a battery cell having a container for the battery elements and electrolyte, instrumentalities for effecting the connection and disconnection of the cell with and from a circuit, and means controlled by said instrumentalities for respectively effecting the sealing and venting of said container upon such connection and disconnection, substantially as described.

2. In combination, a casing having a cover, a battery cell disposed in said casing and having a container for the battery elements and electrolyte, and means controlled by movements of said cover to effect the connection and disconnection of said cell with and from a circuit and to effect the sealing and venting of said container, substantially as described.

3. In combination, a casing having a cover, a battery cell disposed in said casing and having a container for the battery elements and electrolyte, said container having a vent, and means controlled by said cover adapted upon the closing of the cover to effect the connection of said cell with a circuit and the closure of said vent and upon the opening of said cover to effect the disconnection of said cell from said circuit and the opening of said vent, substantially as described.

4. In combination, a casing provided with a cover, and a battery cell disposed in said casing and having a container for the battery elements and electrolyte, said container having a vent and a valve controlling said vent, said valve being movable to open and closed positions and being biased to one of said positions, movement of said cover in a given direction being operative to effect movement of said valve to the other of said positions, substantially as described.

5. In combination, a casing provided with a cover, and a battery cell disposed in said casing and having a container for the battery elements and electrolyte, said container having a vent and a valve controlling said vent, said valve being movable to open and closed positions, movement of said cover in opposite directions being respectively operative to effect movements of said valve to open and closed positions, substantially as described.

6. In combination, a casing provided with a cover, and a battery cell disposed in said casing and having a container for the battery elements and electrolyte, said container having a vent and a valve controlling said vent, said valve being movable to open and closed positions and being biased to one of said positions, movement of said cover in a given direction being operative to effect movement of said valve to the other of said positions, said cover being provided with means whereby movement of the cover also controls the connection of said cell with a circuit, substantially as described.

7. In combination, a casing provided with a cover, and a battery cell disposed in said casing and having a container for the battery elements and electrolyte, said container having a vent and a valve controlling the said vent, said valve being biased to open position, movement of said cover in a given direction being operative to effect movement of said valve to closed position, substantially as described.

8. In combination, a battery cell having a container for the battery elements and electrolyte, said container being provided with a vent and a valve controlling said vent, said valve being movable to open and closed positions and biased to one of said positions, and means for controlling the connection of said cell with a circuit, said means being adapted positively to effect movement of said valve to the other of said positions when the cell is connected with said circuit, substantially as described.

9. A battery cell having a container for the battery elements and electrolyte, said container having vent means comprising a casing applied to the container, the bottom of said casing being provided with an opening for establishing communication between said casing and container, said casing also being provided with an opening establishing communication between the casing and the outside atmosphere, a resilient member adjacent the bottom of said casing having an opening communicating with the opening in said bottom, a valve mounted in said casing and having a tapered portion adapted when the valve is depressed to enter and tightly close the opening in said resilient member, said valve having a portion extending through and above the top of said casing whereby the valve may be moved to closed position from outside the cell, and a spring tending to maintain the valve in open position, substantially as described.

10. A battery cell having a container for the battery elements and electrolyte, said container having vent means comprising a casing applied to the container, said casing having openings respectively establishing communication between said casing and container and between the casing and the outside atmosphere, a valve disposed within said casing controlling one of said openings, and resilient means tending to maintain the valve in open position, said valve having a portion extending upwardly from said casing whereby the valve may be moved to closed position from outside the cell, substantially as described.

11. A battery cell having a container for the battery elements and electrolyte, said container having vent means comprising a casing applied to the container, said casing having openings respectively establishing communication between said casing and container and between the casing and the outside atmosphere, a valve mounted in said casing for controlling one of said openings, and a spring tending to maintain the valve in open position, said valve being adapted to be moved from without the casing and against the action of said spring to closed position, substantially as described.

12. A battery cell having a container for the battery elements and electrolyte, said container having vent means comprising a casing applied to the container, said casing having openings respectively establishing communication between said casing and container and between the casing and the outside atmosphere, a valve mounted in said casing for controlling one of said openings, said valve being provided with a flange or collar intercepting the path of the gases passing through said casing, and a spring coacting with said collar or flange to maintain the valve in open position, said collar or flange also coacting with a wall of said casing to limit the opening movement of the valve, substantially as described.

13. In apparatus of the character described, a battery cell having a container for the battery elements and electrolyte, said container having an opening, and an arrangement for controlling the venting of said container, said arrangement including a valve for said opening and acting to maintain such valve closed throughout the discharging operation of the cell and also including means which acts automatically to open said valve upon the starting of another condition of operation of the cell and which maintains such valve open throughout such other condition of operation, substantially as described.

14. In apparatus of the character described, a battery cell having a container for the battery elements and electrolyte, said container having an opening, and an arrangement for controlling the venting of said container, said arrangement including a valve for said opening, a device adapted to maintain such valve closed throughout the discharging operation of the cell, said device being movable to effect the starting and discontinuance of the discharging operation of the cell, and means for causing said valve to open upon movement of said device to effect discontinuance of such charging operation and adapted to maintain the valve open until said device is moved to effect the starting of said discharging operation, substantially as described.

This specification signed this 27th day of January, 1922.

ROSCOE J. SMITH.